United States Patent [19]
Odaka

[11] Patent Number: 6,064,176
[45] Date of Patent: May 16, 2000

[54] ELECTRONIC APPARATUS AND FLASH DEVICE

[75] Inventor: Yukio Odaka, Kawasaki, Japan

[73] Assignee: Canon Kabushiki Kaisha, Tokyo, Japan

[21] Appl. No.: 09/140,168

[22] Filed: Aug. 26, 1998

[30] Foreign Application Priority Data

Sep. 1, 1997 [JP] Japan ................................. 9-236143

[51] Int. Cl.[7] ................................ H02J 7/00; G03B 7/26

[52] U.S. Cl. ......................... 320/106; 396/205; 396/206

[58] Field of Search ............................ 320/106; 396/205, 396/206

[56] References Cited

U.S. PATENT DOCUMENTS

| | | | |
|---|---|---|---|
| 4,577,145 | 3/1986 | Mullersman | 320/106 |
| 5,734,254 | 3/1998 | Stephens | 320/106 |
| 5,752,102 | 5/1998 | Matsui et al. | 396/156 |
| 5,780,992 | 7/1998 | Beard | 320/106 |
| 5,847,539 | 12/1998 | Akiya | 320/106 |

*Primary Examiner*—Peter S. Wong
*Assistant Examiner*—Gregory J. Toatley, Jr.
*Attorney, Agent, or Firm*—Robin, Blecker & Daley

[57] ABSTRACT

An electronic apparatus capable of selectively using a plurality of kinds of batteries includes a battery discriminating circuit for making a discrimination of the kind of the battery used, and a current change-over circuit for changing over a supply current of the battery used, in accordance with a result of the discrimination made by the battery discriminating circuit.

13 Claims, 7 Drawing Sheets

ELECTRONIC APPARATUS AND FLASH DEVICE

BACKGROUND OF THE INVENTION

1. Field of the Invention

The present invention relates to an electronic apparatus such as a camera using a battery, and in particular, to a flash device for the camera.

2. Description of Related Art

Recently, lithium batteries are commonly used as power supplies for cameras. The lithium batteries have a feature of small self-discharge and, therefore, are adequate for electronic apparatuses that are intensively used in some occasions and are not used for some extent of period until next occasions.

In addition, in an electronic apparatus such as a camera not using silver-halide film, for example, a VTR or a digital camera that uses a CCD or the like that is an imaging device, a secondary battery such as a nickel-cadmium battery (Ni—Cd battery) that is rechargeable is commonly used. The Ni—Cd battery has problems of memory effect, which makes charged electric charges disable to be taken out if the Ni—Cd battery is left in the charged state for long time, and of large self-discharge. Therefore, although the Ni—Cd battery is adaptive for a VTR, a digital camera, and the like that use the charged electric charges in a short time, the Ni—Cd battery is not commonly used as a main power supply for a silver-halide camera or the like, but it is presently used as an auxiliary power supply for a flash device and a motor drive device.

By the way, recently, electronic apparatuses adopting lithium ion batteries that are secondary batteries similarly to Ni—Cd batteries have increased. Since this lithium ion battery has a characteristic of self-discharge being smaller than that of the Ni—Cd battery, and has no memory effect, the lithium ion battery can be stored in the charged state for a long time and is convenient also as a backup battery. Hence, the lithium ion battery is mounted also as a power supply for a portable telephone, a VTR, a digital camera or the like.

Although a lithium ion battery has the above-described merits against a Ni—Cd battery, as demerits, it has problems that it is weak to overcharge and becomes not functional as a battery due to overdischarge. Therefore, several safety circuits become necessary as measures against these problems in an apparatus having large current consumption, such as a flash device.

For example, a fully charged voltage of a lithium ion battery is about 4 V per cell, and a tripping voltage of an overdischarge protection circuit is about 2.5 V. If the lithium ion battery is used for a common flash device, the voltage of the battery lowers to a voltage equal to or lower than the tripping voltage of the overdischarge protection circuit due to large current consumption of the flash device, and hence an inconvenience that the output of the battery is shut off arises.

In addition, also in the case of continuously using a large current, an inconvenience that the current is limited due to an increase of resistance of a PTC device that is called a polyswitch arises. Therefore, a circuit which limits a current supplied to a booster circuit of the flash device, and the like, become necessary.

Furthermore, it is desirable in a portable apparatus to be able to use a plurality of power supplies. For example, there have been commercially produced cameras in which AA-sized alkaline manganese batteries and lithium batteries, which are primary batteries, can be selectively used.

Moreover, a camera including a flash device in which a lithium battery, which is a primary battery, and a lithium ion battery or the like, which is a rechargeable, secondary battery, can be selectively used has a problem that charging performance of the primary battery is made lower by the current limiting circuit necessary for use of the secondary battery.

BRIEF SUMMARY OF THE INVENTION

In accordance with one aspect of the present invention, there is provided an electronic apparatus capable of selectively using a plurality of kinds of batteries, which comprises battery discriminating means for making a discrimination of the kind of the battery used, and current change-over means for changing over a supply current of the battery used, in accordance with a result of the discrimination made by the battery discriminating means, so that the supply of current adaptive to the characteristic of the battery used can be performed.

In accordance with another aspect of the present invention, there is provided a flash device capable of selectively using a plurality of kinds of batteries, which comprises charging means for boosting a supply voltage of the battery used and charging a capacitor for flash emission, battery discriminating means for making a discrimination of the kind of the battery used, and current change-over means for changing over a supply current to be supplied to the charging means from the battery used, in accordance with a result of the discrimination made by the battery discriminating means, so that if a secondary battery is used, the output of the secondary battery is prevented from being shut off due to overdischarge by the limitation of a supply current from the secondary battery, and, if a primary battery is used, the charging performance of the primary battery is prevented from being lowered by the current limitation function that is effective when the secondary battery is used. Owing to these functions, there can be realized an electronic apparatus such as a flash device that is convenient.

These and further aspects and features of the present invention will become apparent from the following detailed description of preferred embodiments thereof taken in conjunction with the accompanying drawings.

DETAILED DESCRIPTION OF THE INVENTION

Preferred embodiments of the present invention will be described below in detail with referring to the drawings.

(First Embodiment)

Figure 1:
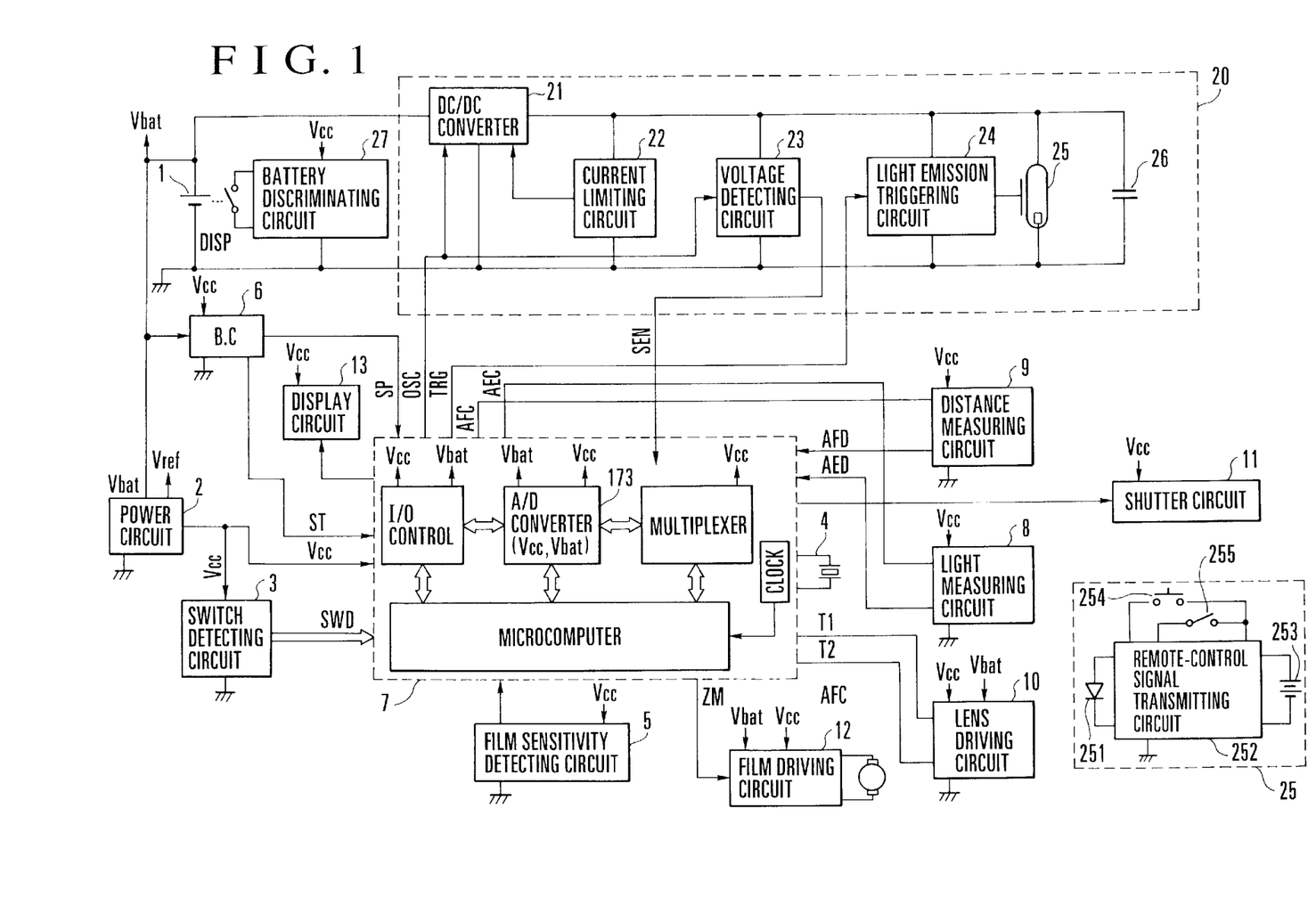
FIG. 1 is a block diagram of an electric circuitry of a camera having a flash device, according to a first embodiment of the present invention.

FIG. 1 shows the electric construction of a camera having a flash device, according to a first embodiment of the present invention. In FIG. 1, reference numeral 1 denotes a battery serving as a power supply, and reference numeral 2 denotes a power circuit. The power supply battery 1 and the power circuit 2 supply an electric power for a logic system, an electric power for a linear control system, a reference voltage and the like to respective circuit blocks described later.

Reference numeral 3 denotes a switch detecting circuit. The switch detecting circuit 3 detects states of a power switch, an open/close switch of a rear lid (an open/close lid in a film loading space) of the camera, a zoom switch of a photo-taking lens, a release switch and the like.

Reference numeral 4 denotes a clock generating circuit having a source oscillator such as a crystal. The clock generating circuit 4 gives a clock signal to a microcomputer 7 described later. Reference numeral 5 denotes a film sensitivity detecting circuit for reading information about film speed from a code indicated on a cartridge case of the film.

Reference numeral 6 denotes a remaining amount detecting circuit for detecting the remaining amount of the battery 1. Reference numeral 7 denotes the one-chip microcomputer. The microcomputer 7 includes a CPU, memories such as ROM and RAM, and an A/D converter 173 and performs sequence control of the camera. Reference numeral 8 denotes a light measuring circuit for obtaining luminance information of a subject for photo-taking. Reference numeral 9 denotes a distance measuring circuit for obtaining distance information of the subject.

Reference numeral 10 denotes a lens driving circuit for driving the lens for focusing. Reference numeral 11 denotes a shutter circuit. The shutter circuit 11 gives to the film an exposure calculated by the microcomputer 7 on the basis of the information from the light measuring circuit 8 and the film sensitivity detecting circuit 5.

Reference numeral 12 denotes a film driving circuit for performing winding-up at the time of film loading, winding-up of photo-taken frames, and rewinding at the time of completing the photo-taking of the last frame in the film.

Reference numeral 13 denotes a display circuit. The display circuit 13 displays the number of photo-taking frames, a photo-taking mode inputted to the switch detecting circuit 3, information related to charging of the flash device, and the like.

Reference numeral 20 denotes the flash device, and reference numeral 21 denotes a DC/DC converter for boosting a voltage of the battery 1. Reference numeral 22 denotes a current limiting circuit, reference numeral 23 denotes a voltage detecting circuit for detecting a voltage of a main capacitor 26 to be described later. The voltage detecting circuit 23 gives voltage information to the microcomputer 7.

Reference numeral 24 denotes a light emission triggering circuit. The light emission triggering circuit 24 gives a trigger voltage for flashing to a discharge tube 25. Reference numeral 26 denotes the main capacitor, which is charged by an output of the DC/DC converter 21.

Reference numeral 27 denotes a battery discriminating circuit for making a discrimination as to whether the battery loaded in the camera is a primary battery or a secondary battery. Incidentally, the battery discriminating circuit 27 detects the difference of cartridge shapes of the primary and secondary batteries with a switch mechanism, and hence any types of switches can be used.

Figure 4:
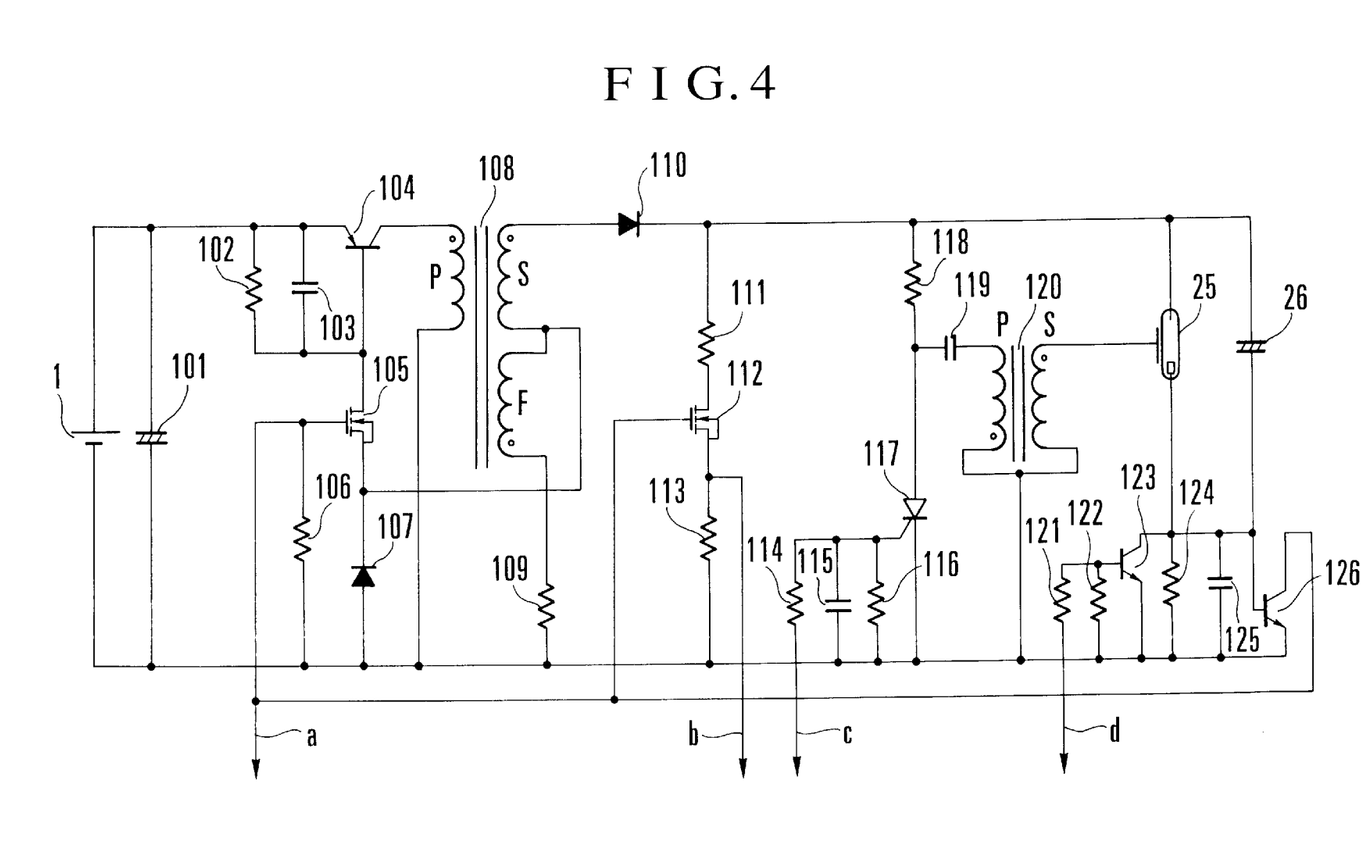
FIG. 4 is a circuit diagram showing a concrete example of the electric circuitry of the flash device.

Here, concrete construction of an electric circuit of the flash device 20 will be described with referring to FIG. 4. In FIG. 4, reference numeral 101 denotes a power capacitor inserted in parallel to the battery 1, reference numerals 102 and 103 denote a resistor and a capacitor, respectively, that are connected in parallel between the base and emitter of an oscillation transistor 104.

Reference numeral 105 denotes a switching device for controlling a base current of the oscillation transistor 104, reference numeral 106 denotes a resistor. The resistor 106 is connected between the control electrode of the switching device 105 and a negative electrode of the battery 1.

Reference numeral 107 denotes a diode, which is connected to the switching device 105. Reference numeral 108 denotes an oscillation transformer, the primary winding P of which is connected to the emitter of the oscillation transistor 104 and to the negative electrode of the battery 1. Reference numeral 109 denotes a resistor, which is connected to the feedback winding F of the oscillation transformer 108 and to the negative electrode of the battery 1.

Reference numeral 110 denotes a rectifier diode, which is connected to rectify an AC electromotive force generated in the secondary winding S of the oscillation transformer 108. In addition, the resistors 102, 103, and 106, the oscillation transistor 104, the switching device 105, the diodes 107 and 110 and the oscillation transformer 108 constitute the DC/DC converter 21 shown in FIG. 1. The DC/DC converter 21 performs a boosting operation of the battery voltage for charging the flash device, in response to a high-level signal being inputted to a connection terminal "a" from the microcomputer 7.

Reference numeral 112 denotes a switching device. The switching device 112 is connected to the resistors 111 and 113 in series, and this serial circuit is connected in parallel to the main capacitor 26. In addition, the resistors 111 and 113 and the switching device 112 constitute the voltage detecting circuit 23 shown in FIG. 1. The voltage detecting circuit 23 is activated by a high-level signal being inputted from the microcomputer 7 to the connection terminal "a", to send the detected voltage to the microcomputer 7 from a connection terminal "b".

Reference numerals 114 and 116 denote resistors, reference numeral 115 denotes a capacitor, and reference numeral 117 denotes a thyristor. The resistor 114 limits a gate current of the thyristor 117, and the resistor 116 and the capacitor 115 are connected between the gate and cathode of the thyristor 117 to prevent a malfunction. Reference numeral 118 denotes a resistor, which is constructed to make a trigger capacitor 119 charged through the primary winding P of a trigger transformer 120. In addition, the resistors 114, 116, and 118, the capacitors 115 and 119, the thyristor 117 and the trigger transformer 120 constitute the light emission triggering circuit 24 shown in FIG. 1. The light emission triggering circuit 24 operates in response to a high-level light-emission signal being inputted from the microcomputer 7 to a connection terminal "c".

Reference numerals 121 and 122 denote resistors, and reference numeral 123 denotes a transistor. The resistor 121 is connected to the transistor 123 for controlling a base current thereof and the resistor 122 is connected to the transistor 123 for preventing malfunction.

Reference numeral 124 denotes a resistor for detecting a charging current, which is connected in parallel to a capacitor 125 between the base and emitter of a transistor 126. The collector of the transistor 126 is connected to the control electrode of the switching device 105. In addition, the resistor 124 and the transistor 126 constitute the current limiting circuit 22 shown in FIG. 1.

Next, the operation of the camera constructed in the above manner will be described with referring to a flow chart of FIG. 2. When an ON signal from a power switch of the camera or a switch interlocking with a lens barrier and the like is given to the switch detecting circuit 3. The switch detecting circuit 3 causes the microcomputer 7 to start operation by giving to the clock generating circuit 4 a signal for operating the microcomputer 7. Then, the microcomputer 7 controls the photo-taking sequence after predetermined initialization.

In step S1, initialization and the like for the operation of the microcomputer 7 are performed. In addition, here, the input waiting state of the SW1 signal inputted by half-pressing the release button will be described first.

If the input of the SW1 signal is detected in steps S2 and S3, the process proceeds to step S4. At step S4, the remaining amount of the battery 1 is detected through the remaining amount detecting circuit 6.

Next, if the remaining amount of the battery 1 detected in step S4 is sufficient to photo-taking in step S5, the process proceeds to step S6, and if not, the process returns to step S1.

In step S6, the luminance of a subject is measured through the light measuring circuit 8, and calculation of exposure information is performed on the basis of this measurement result and the information from the film sensitivity detecting circuit 5.

Next, a subject distance is measured through the distance measuring circuit 9 in step S7.

In step S8, whether the luminance of the subject is larger or not than the predetermined one is judged, and if larger, the process proceeds to step S10, and if not, the process proceeds to step S9.

Figure 3:
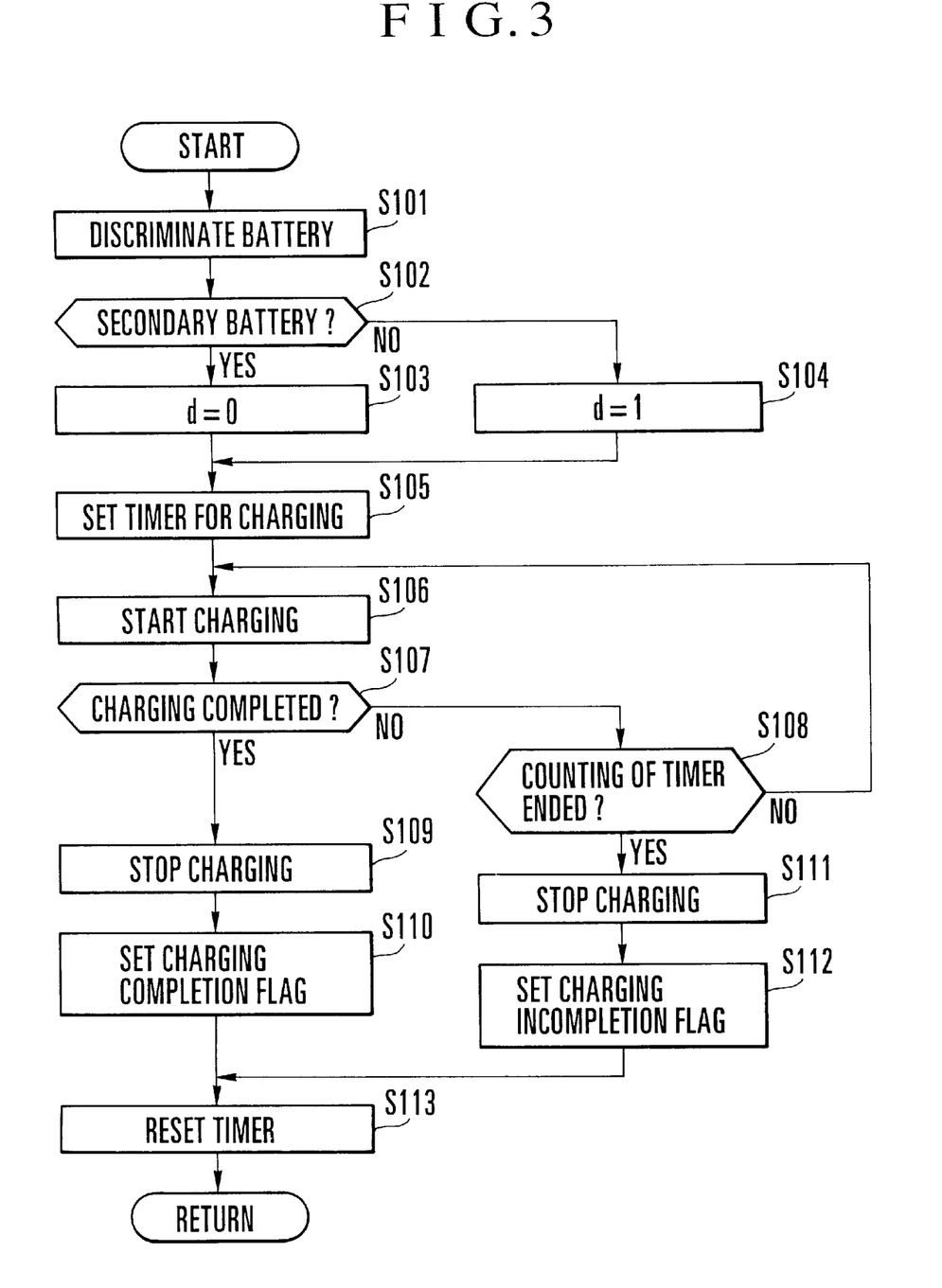
FIG. 3 is a flow chart of a charging operation in the flash device.

In step S9, a subroutine for charging the flash device shown in FIG. 3 is executed. This subroutine for charging the flash device will be described later.

In step S10, inputting of a SW2 signal, which is inputted by fully-pressing the release button for photo-taking, is waited, and when the inputting of the SW2 signal is detected, the process proceeds to step S11.

In step S11, the lens is moved to a focused focal position corresponding to the distance information obtained in step S6.

Subsequently, in step S12, the shutter is controlled on the basis of the exposure information obtained in step S6, thereby performing exposure. In addition, if flash emission is necessary in this situation, an aperture value adequate for flash photo-taking is set, and the flash device is caused to emit flash by giving a high-level light emission signal to the connection terminal "c" of the electric circuit in the flash device.

Next, in step S13, the lens is returned to the initial predetermined position after completion of the exposure. Then, in step S14, a frame of film that is photo-taken is wound up.

Furthermore, in step S15, whether the flash emission has been performed in step S12 is judged, and if so, the process proceeds to step S16, and a subroutine to be executed in step S9 is executed for charging the flash device. In this manner, when the control of the photo-taking sequence is completed, the camera returns to the initial state.

Next, the subroutine for charging the flash device will be described with referring to a flow chart of FIG. 3. First, in steps S101 and S102, whether the battery 1 is a secondary battery or a primary battery is judged through the battery discriminating circuit 27. If it is the secondary battery, the process proceeds to step S103, and if it is the primary battery, the process proceeds to step S104.

In step S103, a low-level signal (d=0) for making the current limiting circuit 22 operative is given to a connection terminal "d" shown in FIG. 4, and the process proceeds to step S105.

In step S104, a high-level signal (d=1) for making the current limiting circuit 22 inoperative is given to the connection terminal "d", and the process proceeds to step S105.

In step S105, a timer for stopping charging is set and activated before charging the flash device. The timer can be commonly set at about 10–20 seconds.

In step S106, a high-level signal is outputted to the connection terminal "a" shown in FIG. 4 for making the flash device charged.

Next, in step S107, an output from the voltage detecting circuit 23 activated by the high-level signal inputted into the connection terminal "a" is inputted to the A/D converter 173 of the microcomputer 7 through the connection terminal "b". This output data is compared with a predetermined voltage data (here, data corresponding to about 330 V that is a voltage in a fully charged state). If the voltage is in a state before completion of charging, the process proceeds to step S108, and if a state of completion of charging, the process proceeds to steps S109 and S110.

In step S108, whether the timer started in step 105 counts up the predetermined time is judged, and if the timer is before counting up, the process returns to step S106 to continue charging. If the timer counts up, the process proceeds to steps S111 and S112.

In steps S111 and S112, a low-level signal is inputted to the connection terminal "a", charging of the flash device is stopped at the state of incomplete charging of the flash device, an output of the voltage detecting circuit 23 is stopped, and further a flag showing that the charging of the flash device is incomplete is set.

On the other hand, in steps S109 and S110, a low-level signal is inputted to the connection terminal "a" similarly to step S111, the charging of the flash device is stopped in the state of complete charging of the flash device, the output of the voltage detecting circuit 23 is stopped, and further a flag showing that the charging of the flash device is complete is set.

Figure 2:
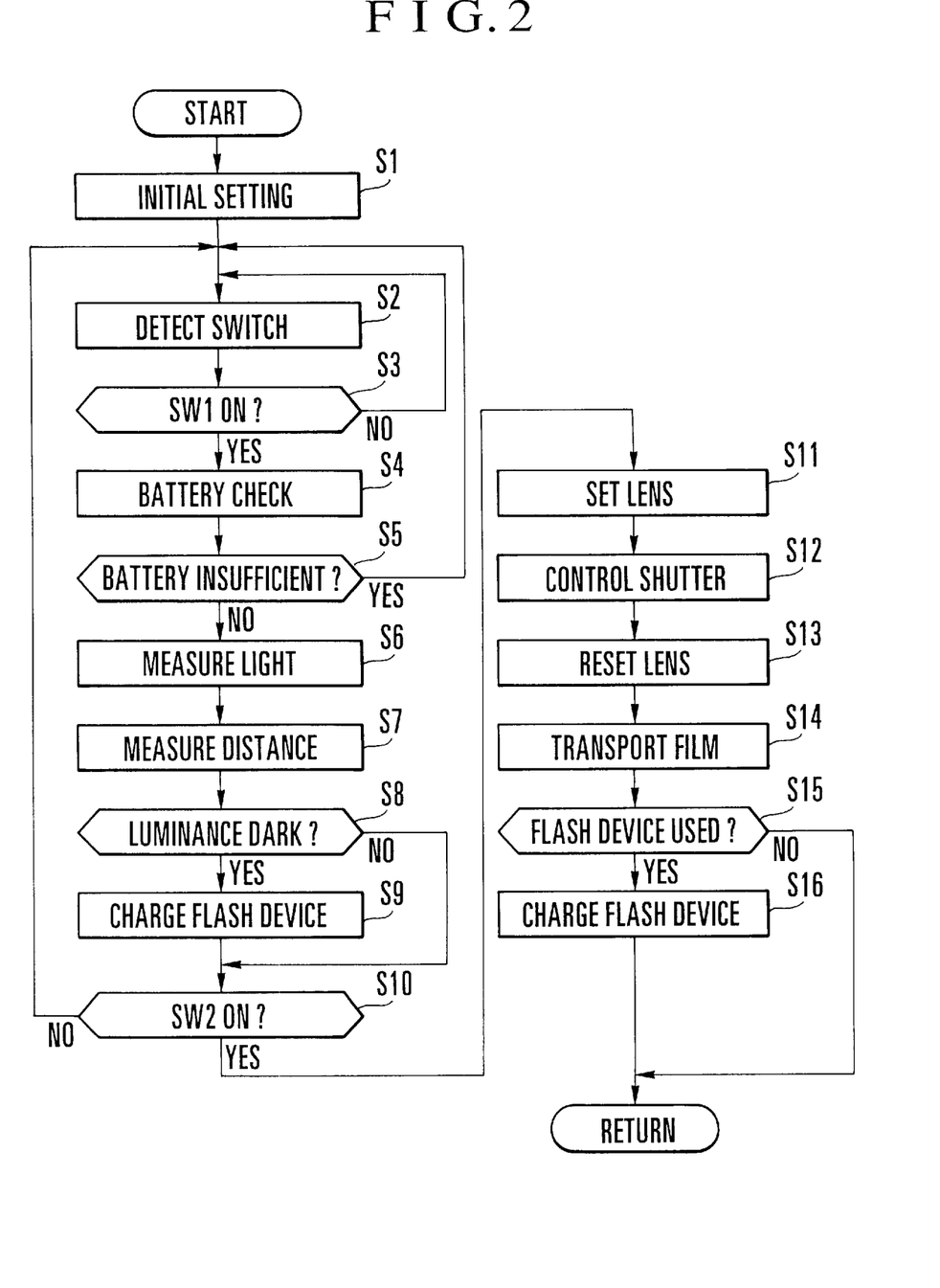
FIG. 2 is a flow chart of a photo-taking operation in the camera.

In this manner, when the subroutine for charging the flash device is completed, the process returns to step S10 of the main routine shown in FIG. 2.

Next, the operation of the circuit of FIG. 4 in executing the subroutine for charging the flash device will be described. If the battery discriminating circuit 27 detects a secondary battery (step S102), a low-level signal is given to the connection terminal "d" (step S103) and the transistor 123 becomes OFF. In this state, a high-level signal is given to the connection terminal "a" so that the charging of the flash device is performed (step S106). Then, the control electrodes of the switching devices 105 and 112 become at a high-level, and hence the switching devices 105 and 112 become ON.

Owing to turning-on of the switching device 105, a base current of the oscillation transistor 104 flows in a loop composed of the battery 1, the base-emitter of the transistor 104, the feedback winding F of the oscillation transformer 108 and the resistor 109.

Owing to this, a current that is $h_{FE}$ times the base current flows in the collector of the transistor 104 through the primary winding P of the oscillation transformer 108. An inductive electromotive force is generated in the secondary winding S due to the current flowing through the primary winding P, and this current is supplied to the main capacitor 26 in a loop composed of the diode 110, the main capacitor 26, the resistor 124 (or transistor 123), the battery 1, the base-emitter of the oscillation transistor 104 and the switching device 105. This current charges the main capacitor 26 and flows as a base current of the oscillation transistor 104, so that the oscillation transistor 104 instantaneously becomes saturated.

Here, a charging current supplied to the main capacitor 26 also flows through the resistor 124. When a potential generated in the resistor 124 reaches the base-emitter voltage $V_{BE}$ of the transistor 126, the transistor 126 becomes ON to bypass the high-level signal at the connection terminal "a", thereby making the terminal "a" at the low-level.

Therefore, the switching device 105 temporarily becomes OFF from ON, and an electromotive force in the secondary side of the oscillation transformer 108 temporarily stops in company with this. Accordingly, since no potential is generated in the resistor 124, the transistor 126 becomes OFF. Therefore, since the high-level signal from the connection terminal "a" is given again to the control electrode of the switching device 105, the switching device 105 becomes ON again. By repeating this, the oscillating operation of the oscillation transformer 108 is performed in the period shorter than that at the time of detection of a primary battery described later.

By this oscillating operation, the main capacitor 26 is charged and its voltage increases. Then, since the switching device 112 given the high-level signal from the connection terminal "a" is ON, a potential that is divided by the resistors 111 and 113 is generated in the connection terminal "b", and this potential is detected by the A/D converter 173 of the microcomputer 7. Then, when this potential reaches a predetermined level, it is detected as a fully charged state (step S107), and the oscillating operation stops since the high-level signal given from the microcomputer 7 through the connection terminal "a" becomes at a low-level.

On the other hand, if the battery discriminating circuit 27 detects a primary battery, a high-level signal is given to the connection terminal "d" (step S104), and hence a base current of the transistor 123 flows through the resistor 121. Therefore, the transistor 123 becomes ON to short-circuit between the resistor 124 and the base and emitter of the transistor 126, so that the oscillating operation is performed in a normal period.

Figure 5A:
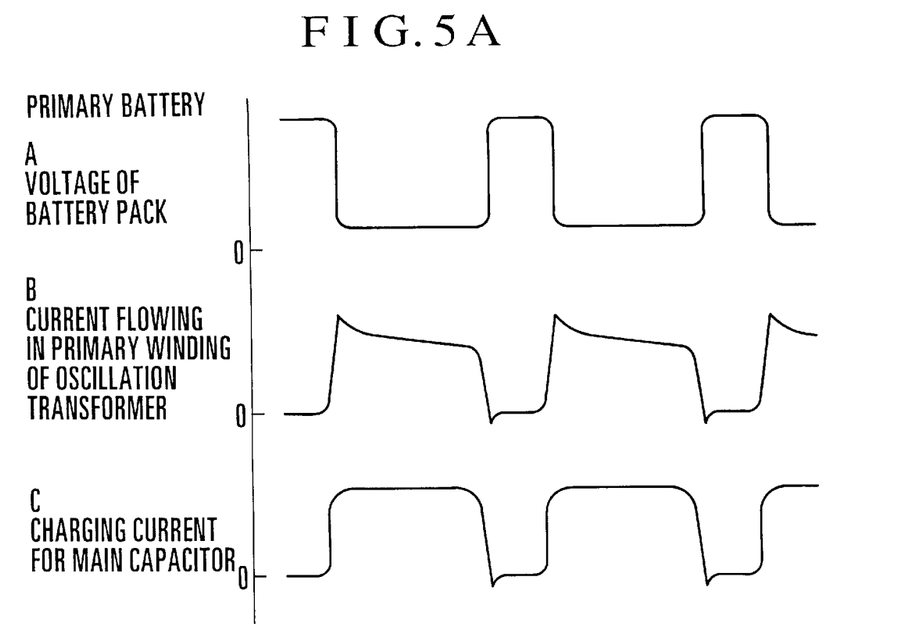
FIGS. 5A and 5B are graphs showing the changes of battery voltages, battery currents, and main capacitor charging currents in the flash device.
Figure 5B:
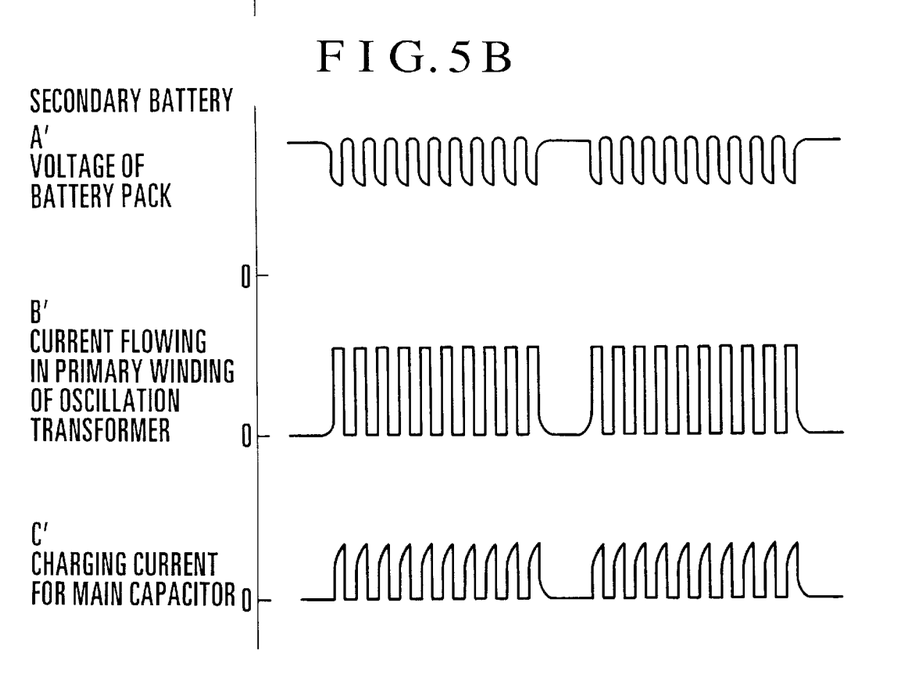

Here, FIGS. 5A and 5B show the changes of the battery voltages A and A', the currents B and B' flowing in the primary winding P of the oscillation transformer 108, and the charging currents C and C' of the main capacitor 26. FIG. 5A shows the changes at the time when the primary battery is used, and FIG. 5B shows the changes at the time when the secondary battery is used.

It can be seen from FIGS. 5A and 5B that the charging current C' at the time of the secondary battery being used is made to be intermittent by the resistor 124 and the transistor 126 with its maximum current being a predetermined one in the period shorter than that of the charging current C at the time of the primary battery being used. For this reason, since the charging quantity per unit time of the main capacitor 26 at the time of the secondary battery being used is smaller than that at the time of the primary battery being used, the charging time at the time of the secondary battery being used becomes resultantly longer than that at the time of the primary battery being used.

Figure 6:
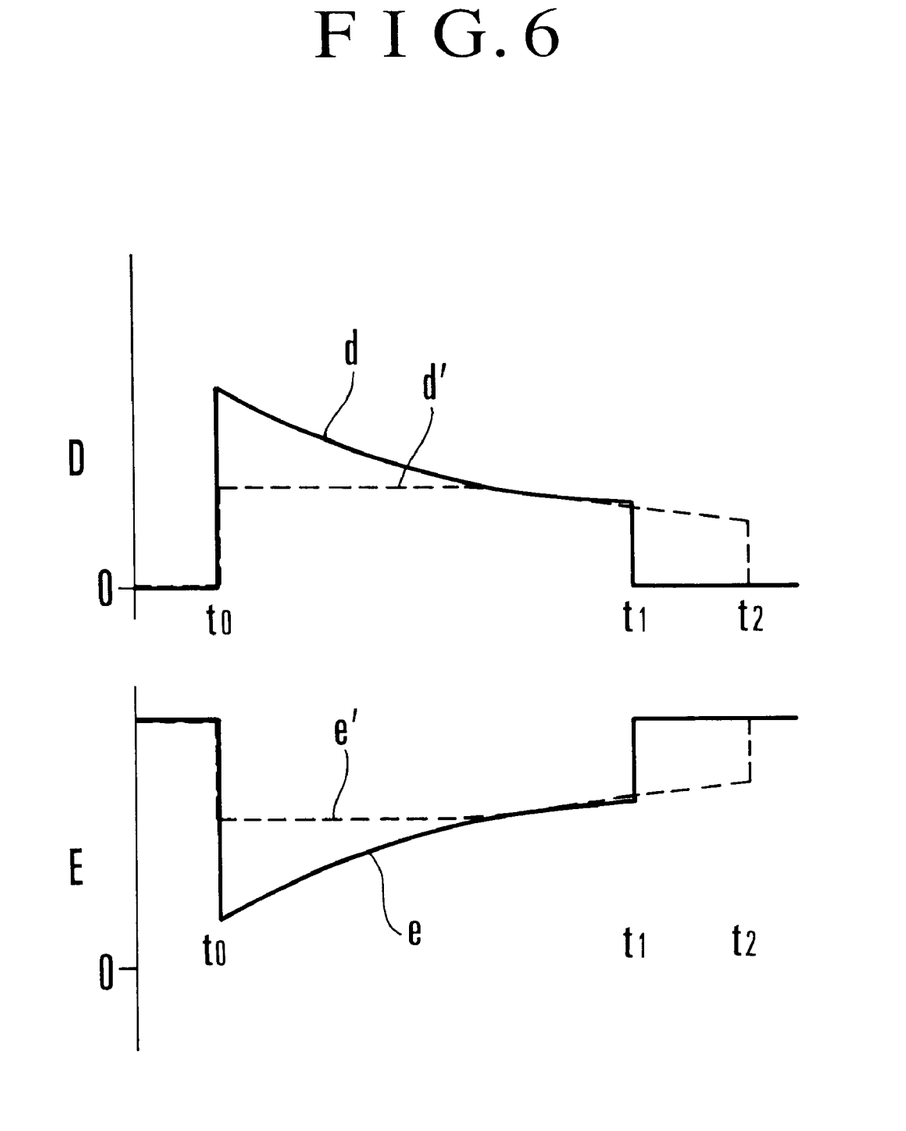
FIG. 6 is a graph showing the changes of a battery current and a battery voltage from the start of charging the main capacitor to the end thereof.

FIG. 6 shows the changes of the supply current D and supply voltage E of the battery 1 from the start time t0 of the oscillating operation of the oscillation transformer 108 (charging of the main capacitor 26) to the completion time t1 (at the time of the primary battery being used) and t2 (at the time of the secondary battery being used) of the charging of the main capacitor 26. In FIG. 6, waveforms d and e in full lines show ones at the time of the primary battery being used, and waveforms d' and e' in broken lines show ones at the time of the secondary battery being used.

It can be seen in FIG. 6 that the battery voltage e' lowers at the time of the secondary battery being used only to the extent similar to that at the time of the primary battery being used, as the result of the supply current d' of the battery 1 being limited by the current value determined by the resistance of the resistor 124 and the base-emitter voltage $V_{BE}$ of the transistor 126.

Letting the number of turns of the primary winding in the oscillation transformer 108 be $N_1$, the number of turns of the secondary winding in the oscillation transformer 108 be $N_2$, the resistance of the resistor 124 be R, and the base-emitter voltage of the transistor 126 be $V_{BE}$, the supply current d' ($I_{Batt}$) of the battery 1 can be approximately obtained as follows:

$$I_{Batt} = \frac{V_{BE}}{R} \cdot \frac{N_2}{N_1}.$$

Therefore, letting the resistance of the battery 1 be $R_{Batt}$ and the open voltage of the battery 1 be $V_{Batt}$, a voltage $V_{min}$ of the battery 1 that is lowered at a minimum can be approximately obtained as follows:

$$V_{min} = V_{Batt} - R_{Batt} \times \frac{V_{BE}}{R} \cdot \frac{N_2}{N_1}.$$

Therefore, by adequately setting the resistance of the resistor 124, it becomes possible to suppress the voltage reduction of the secondary battery.

(Second Embodiment)

Figure 7:
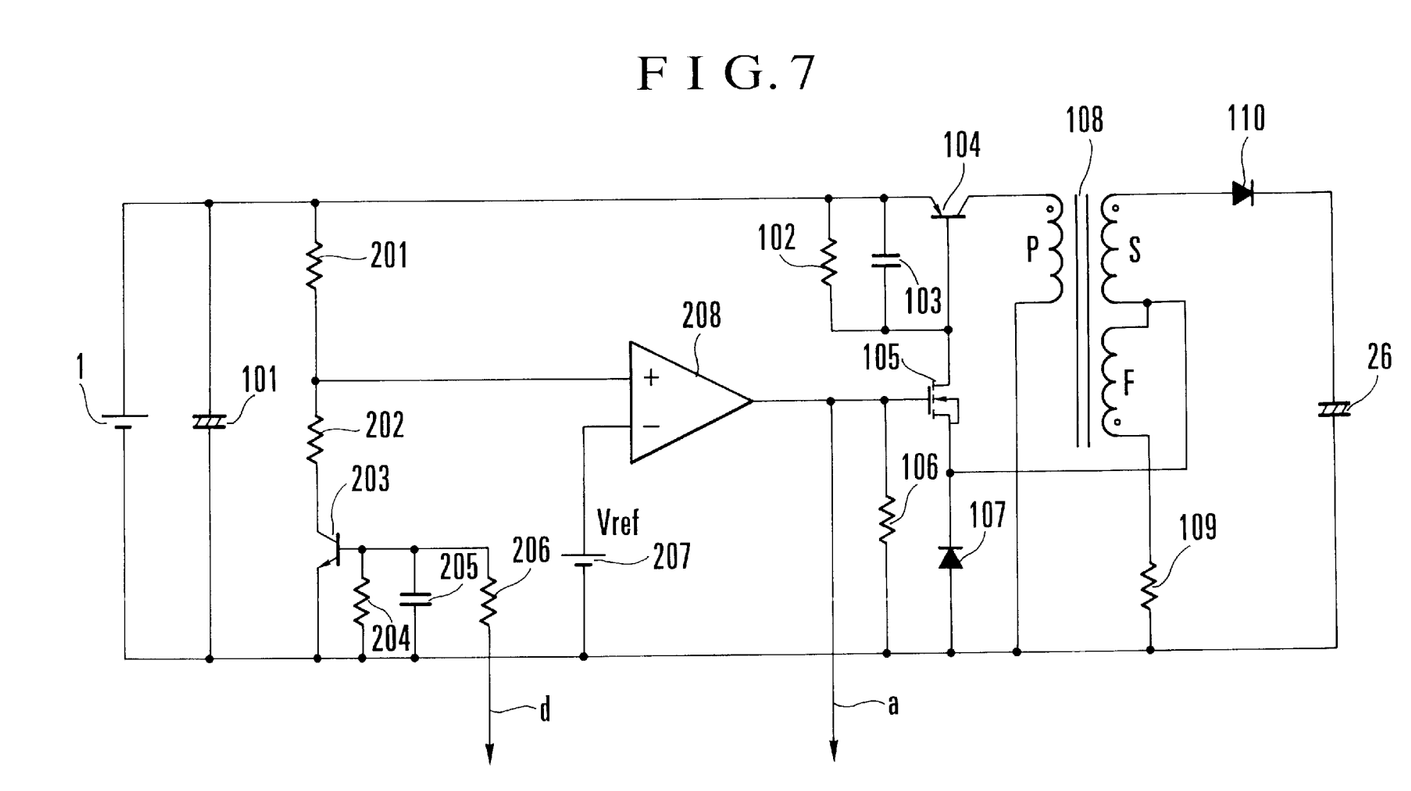
FIG. 7 is an electric circuit diagram of a flash device according to a second embodiment of the present invention.

FIG. 7 shows an electric circuit of a flash device according to a second embodiment of the present invention. The second embodiment is a modified example of the concrete circuit of the DC/DC converter 21 shown in FIG. 4 in the first embodiment, and other circuits are omitted. Furthermore, the same reference numerals are assigned to the parts that are the same as or equivalent to those in FIG. 4.

Reference numerals 201 and 202 denote resistors. The resistors 201 and 202 are connected to the battery 1 in parallel through a transistor 203 to divide the battery voltage. Reference numerals 204 and 205 denote a resistor and a capacitor, respectively. The resistor 204 and the capacitor 205 are connected in parallel between the base and emitter of the transistor 203 to prevent a malfunction of the transistor 203. Reference numeral 206 denotes a resistor, which is connected to limit a base current of the transistor 203. Reference numeral 207 denotes a predetermined reference power supply $V_{ref}$ that is given from the power circuit 2 shown in FIG. 1. Reference numeral 208 denotes a comparator having an open collector.

In the second embodiment, if it is judged by the microcomputer 7 through the battery discriminating circuit 27 that the battery 1 used is a primary battery, a low-level signal is given to the connection terminal "d", and if the battery 1 used is judged as the secondary battery, a high-level signal is given to the connection terminal "d".

If the battery 1 is judged as the secondary battery, a base current of the transistor 203 flows through the resistor 206 owing to the high-level signal at the connection terminal "d", so that the transistor 203 becomes ON. In this state, if a high-level signal for making the oscillation transformer 108 oscillate is inputted to the connection terminal "a", as described above, a high-level signal is given to the control electrode of the switching device 105, so that the switching device 105 becomes ON. Therefore, a current flows from the battery 1 through the base-emitter of the transistor 104, the switching device 105, the feedback winding F of the oscillation transformer 108 and the resistor 109. Owing to this, a collector current that is $h_{FE}$ times the base current flows from the transistor 104 through the primary winding P of the oscillation transformer 108.

At this time, a current caused by an electromotive force generated in the secondary winding S of the oscillation transformer 108 flows in a loop composed of the diode 110, the main capacitor 26, the battery 1, the base-emitter of the oscillation transistor 104 and the switching device 105. This current is charged in the main capacitor 26, and also becomes a base current of the oscillation transistor 104 to be added to an initial base current. Therefore, the oscillation transistor 104 becomes saturated instantaneously. At this time, by a current flowing from the battery 1, the battery voltage lowers.

In a state of the transistor 203 being ON, a voltage divided by the resistors 201 and 202 is inputted to the comparator 208. Letting the resistances of the resistors 201 and 202 be $R_{201}$ and $R_{202}$, respectively, the input voltage $V_+$ of the comparator 208 can be obtained as follows:

$$V_+ = \{V_{Batt} - V_{CE(S)}\} \times \frac{R_{202}}{R_{201} + R_{202}} + V_{CE(S)}$$

where $V_{CE(S)}$ is a saturation voltage of the transistor 203, and $V_{Batt}$ is the open voltage of the battery 1.

When the battery voltage $V_{Batt}$ becomes such a value that $V_+ < V_-$ may be established against a potential $V_{ref}$ of the other input voltage $V_-$ of the comparator 208, the comparator 208 generates a low-level signal. Accordingly, a high-level signal given to the control electrode of the switching device 105 is bypassed, and instead the low-level signal is given to the control electrode to turn off the switching device 105. The battery voltage $V_{Batt\ min}$ at this time can be obtained as follows:

$$V_{Batt\ min} = \{V_{reff} - V_{CE(S)}\}\left(1 + \frac{R_{201}}{R_{202}}\right) + V_{CE(S)}.$$

According to this formula, reduction of the battery voltage is limited. This means that a battery current $I_{Batt}$ is limited by an internal impedance $R_{Batt}$ of the battery 1, as follows:

$$I_{Batt} = \frac{V_{Batt} - V_{Batt\ min}}{R_{Batt}}$$

where $V_{Batt}$ is the open voltage of the battery 1.

If the battery 1 is judged as the primary battery, the connection terminal "d" becomes at a low-level, so that the transistor 203 becomes OFF. Therefore, an input voltage $V_+$ of the comparator 208 becomes the battery voltage and another input voltage $V_-$ thereof becomes the reference voltage $V_{ref}$. Here, by setting the reference voltage $V_{ref}$ at a sufficiently small value, it becomes possible to set the reference voltage so that the current of the battery 1 is not limited.

In addition, in the second embodiment, although the case of switching between the operative state of the current limiting circuit 22 and the practically inoperative state thereof is described, it is also good to properly select the reference voltage $V_{ref}$, for example, to limit currents at different current levels against both of the primary and secondary batteries from which large currents are not taken out.

Further, in the above-described embodiments, although the camera and the flash device are described, the present invention can be also applied to electronic apparatuses other than the camera and the flash device.

As described above, according to above-described embodiments of the present invention, if the secondary battery is used, it is possible to prevent the battery output from being shut off due to overdischarge of the battery by limiting the supply current of the battery and the like. In addition, if the primary battery is used, as described above, it is possible to prevent performance deterioration of the primary battery due to the current limiting function that is effective at the time of the secondary battery being used. Therefore, it is possible to realize electronic apparatuses such as a flash device that is convenient.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirits and scope of the appended claims. The scope of the following claims is to be accorded the broadcast interpretation so as to encompass all such modifications and equivalent structures and functions.

I claim:

1. An electronic apparatus capable of selectively using a plurality of kinds of batteries, said electronic apparatus comprising:

battery discriminating means for making a discrimination of the kind of the battery used; and current change-over means for changing over a supply current of the battery used, in accordance with a result of the discrimination made by said battery discriminating means.

2. An electronic apparatus according to claim 1, wherein said battery discriminating means judges whether the battery used is a primary battery or a secondary battery.

3. An electronic apparatus according to claim 1, wherein said current change-over means makes the supply current when the battery used is judged as a secondary battery by said battery discriminating means lower than the supply current when the battery used is judged as a primary battery.

4. An electronic apparatus according to claim 1, wherein said current change-over means includes current limiting means for limiting a supply current of the battery to a value equal to or less than a predetermined value, and an operative state and an inoperative state of said current limiting means are changed over in accordance with a result of the discrimination made by said battery discriminating means.

5. An electronic apparatus according to claim 1, wherein the battery supplies a current to charging means for boosting a supply voltage of the battery and charging a capacitor.

6. An electronic apparatus according to claim 1, further comprising charging means for boosting a supply voltage of the battery and charging a capacitor, and wherein said current change-over means has a resistor for detecting a charging current supplied from said charging means to said capacitor.

7. An electronic apparatus according to claim 1, wherein said current change-over means includes a voltage-dividing resistor which divides a supply voltage of the battery, and a comparator.

8. A flash device capable of selectively using a plurality of kinds of batteries, said flash device comprising:

charging means for boosting a supply voltage of the battery used and charging a capacitor for flash emission;

battery discriminating means for making a discrimination of the kind of the battery used; and current change-over means for changing over a supply current to be supplied to said charging means from the battery used, in accordance with a result of the discrimination made by said battery discriminating means.

9. A flash device according to claim 8, wherein said battery discriminating means judges whether the battery used is a primary battery or a secondary battery.

10. A flash device according to claim 9, wherein said current change-over means makes the supply current when the battery used is judged as a secondary battery by said battery discriminating means lower than the supply current when the battery used is judged as a primary battery.

11. A flash device according to claim 8, wherein said current change-over means includes current limiting means for limiting a supply current of the battery to a value equal to or less than a predetermined value, and an operative state and an inoperative state of said current limiting means are changed over in accordance with a result of the discrimination made by said battery discriminating means.

12. A flash device according to claim 8, wherein said current change-over means has a resistor for detecting a charging current supplied from said charging means to said capacitor.

13. A flash device according to claim 8, wherein said current change-over means includes a voltage-dividing resistor which divides a supply voltage of the battery, and a comparator.

* * * * *